Patented Apr. 14, 1936

2,037,437

UNITED STATES PATENT OFFICE 2,037,437

XANTHATES

Ludwig Rosenstein, San Francisco, Calif., assignor, by mesne assignments, to American Cyanamid Company, a corporation of Maine No Drawing. Application November 11, 1929, Serial No. 406,512

11 Claims. (Cl. 260—99.11)

My invention relates to certain new xanthates of secondary and tertiary alcohols which are useful as in flotation processes, for insecticides and as vulcanizing accelerators.

It is the broad object of my invention to provide certain xanthates which have not heretofore been available.

My invention possesses other advantageous features and objects some of which, together with the foregoing, will be set forth at length in the following specification. It is to be understood that the invention, as defined by the claims, is to be accorded a range of equivalents consistent with the state of the prior art.

The xanthates of primary alcohols are readily formed by known reactions. However, the production of the xanthates of secondary and tertiary alcohols by these reactions has not succeeded. In accordance with my invention I am enabled to produce certain xanthates of these alcohols which have not been available heretofore.

In accordance with my invention I have been enabled to produce xanthates from such secondary alcohols as isopropyl alcohol and other secondary alcohols and from tertiary alcohols such as tertiary butyl alcohol.

In forming the potassium xanthates of the secondary alcohols I have proceeded by making a solution of potassium hydroxide, usually one of 50% strength, and then reacting this solution with carbon disulphide and the secondary alcohol whose xanthate is desired. The reaction proceeds at atmospheric pressure and room temperature with liberation of heat. To prevent undue loss of carbon disulphide, it is preferable that a reflux condenser be attached to the reaction vessel or that the reaction vessel be otherwise cooled so that vaporized carbon disulphide is condensed and returned to the reaction. Following the reaction the insoluble xanthate crystallizes out of the mixture. Where alcohols higher in molecular weight than isopropyl alcohol are used it is desirable to cool below room temperature to secure the crystallization of the xanthate. The sodium or other metal xanthate may be formed by starting initially with a solution of the desired metal hydroxide.

The alkali metal xanthate secured from this process possesses water of crystallization. Thus, I have found that the sodium isopropyl xanthate crystallizes out with five molecules of water of crystallization.

When it is particularly desired to form an anhydrous xanthate I have preferably proceeded by contacting the hydroxide of the metal with the alcohol until a considerable proportion had passed into solution in the alcohol. This quantity was determined and sufficient carbon disulphide was added to react in substantially molecular proportions with the hydroxide in the alcohol whereupon the xanthate crystallized out. In this connection I have had material success in forming both the anhydrous sodium and potassium isopropyl xanthate.

In forming the xanthates of the tertiary alcohol I have found that the metal hydroxide is preferably first ground to a fine powder before being added to the alcohol. Thus in preparing potassium tertiary butyl xanthate I have first ground potassium hydroxide to a fine powder and then added it to the tertiary butyl alcohol, the proportions being substantially molecular. Carbon disulphide was then added and the mixture heated under a reflux condenser at the boiling point of the mixture. The heating should be continued for some little time. As the reaction proceeded, the white alcoholate changed to the yellow xanthate which was readily filtered out when the heating was discontinued. This xanthate was found, upon analysis, to be the potassium tertiary butyl xanthate.

In forming the sodium xanthate of the tertiary butyl alcohol I have found that finely divided metallic sodium is preferably first reacted with the tertiary butyl alcohol. After the sodium had reacted with the alcohol, carbon disulphide was added whereupon sodium tertiary butyl xanthate was formed in the mixture. The proportions of reacting substances is preferably molecular. Upon analysis the xanthate was found to be sodium tertiary butyl xanthate.

I claim:

1. As a new composition of matter, an alkali metal xanthate of a monohydric, aliphatic, unsubstituted, saturated secondary alcohol.

2. As a new composition of matter, the potassium xanthate of a monohydric, aliphatic, unsubstituted, saturated secondary alcohol.

3. As a new compound an alkali metal xanthate of isopropyl alcohol.

4. A compound having the following structural formula:

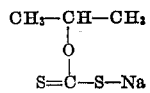

5. As a new compound, an anhydrous alkali-metal xanthate of isopropyl alcohol.

6. As a new compound sodium isopropyl xanthate.

7. Sodium iso-propyl xanthate containing water of crystallization.

8. As a new compound sodium isopropyl xanthate having substantially five molecules of water of crystallization.

9. As a new compound, the anhydrous sodium xanthate of isopropyl alcohol.

10. As a new compound, potassium isopropyl xanthate.

11. As a new compound, the anhydrous potassium xanthate of isopropyl alcohol.

LUDWIG ROSENSTEIN.